United States Patent
Zanzig et al.

(10) Patent No.: US 7,214,731 B2
(45) Date of Patent: May 8, 2007

(54) TIRE WITH LOW HYDROCARBON EMISSION RUBBER COMBINATION OF TREAD AND SIDEWALL COMPONENTS WITH COMPOSITIONAL LIMITATIONS

(75) Inventors: David John Zanzig, Bertrange (LU); Martin Paul Cohen, Fairlawn, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 208 days.

(21) Appl. No.: 10/778,502

(22) Filed: Feb. 13, 2004

(65) Prior Publication Data

US 2004/0192825 A1    Sep. 30, 2004

Related U.S. Application Data

(60) Provisional application No. 60/455,607, filed on Mar. 17, 2003.

(51) Int. Cl.
*B60C 1/00* (2006.01)
(52) U.S. Cl. ............. 524/261; 524/265; 524/267; 524/493; 152/151; 152/209.1
(58) Field of Classification Search ............. 524/261, 524/265, 267, 493; 152/209 R
See application file for complete search history.

(56) References Cited

U.S. PATENT DOCUMENTS

| | | | |
|---|---|---|---|
| 4,474,908 A | 10/1984 | Wagner | 523/213 |
| 5,094,829 A | 3/1992 | Krivak et al. | 423/339 |
| 5,708,069 A | 1/1998 | Burns et al. | 524/403 |
| 5,750,610 A | 5/1998 | Burns et al. | 524/434 |
| 5,780,538 A | 7/1998 | Cohen et al. | 524/494 |
| 5,789,514 A | 8/1998 | Burns et al. | 528/12 |

FOREIGN PATENT DOCUMENTS

| | | |
|---|---|---|
| EP | 1142730 | 10/2001 |
| EP | 1228900 | 8/2002 |
| EP | 1228902 | 8/2002 |
| WO | 2074850 | 9/2002 |

*Primary Examiner*—Kriellion Sanders
(74) *Attorney, Agent, or Firm*—Henry C. Young, Jr.

(57) ABSTRACT

The invention relates to a tire of a structural combination of tire tread and sidewall components with compositional limitations containing minimal, if any, of in situ formed alcohol and methyl isobutyl ketone byproducts. The tread component rubber composition contains pre-hydrophobated silica reinforcement. The sidewall component contains low unsaturation EPDM or brominated copolymer of isobutylene and p-methylstyrene and may contain pre-hydrophobated silica reinforcement. The silica reinforcement for said tread and sidewall components is a pre-hydrophobated precipitated silica. The pre-hydrophobated silica is prepared, prior to mixing with the elastomer(s), by reacting hydroxyl groups (e.g. silanol groups) contained on the surface of a precipitated silica with an alkoxyorganomercaptosilane or a combination of an alkoxyorganomercaptosilane and a substituted alkylsilane or with a bis-3(trialkoxysilylalkyl) polysulfide which contains an average of from 2 to 4 connecting sulfur atoms in its polysulfidic bridge to form a composite thereof. The alcohol byproduct therefrom is removed from the composite prior to its introduction into the rubber composition(s). In another aspect of the invention, the connecting sidewall rubber composition, and optionally the tread composition is free of N-(1,3-dimethylbutyl)-N'-phenyl-p-phenylenediamine antidegradant (referred herein to as 6PPD) in order to prevent in situ formation of methyl isobutyl ketone byproduct from the reaction of 6PPD with atmospheric oxygen and/or ozone.

4 Claims, No Drawings

TIRE WITH LOW HYDROCARBON EMISSION RUBBER COMBINATION OF TREAD AND SIDEWALL COMPONENTS WITH COMPOSITIONAL LIMITATIONS

The Applicants hereby incorporate by reference prior U.S. Provisional Application Ser. No. 60/455,607, filed on Mar. 17, 2003.

FIELD OF THE INVENTION

The invention relates to a tire of a structural combination of tire tread and sidewall components with compositional limitations containing minimal, if any, of in situ formed alcohol and methyl isobutyl ketone byproducts. The tread component rubber composition contains pre-hydrophobated silica reinforcement. The sidewall component contains low unsaturation EPDM or brominated copolymer of isobutylene and p-methylstyrene and may contain pre-hydrophobated silica reinforcement. The silica reinforcement for said tread and sidewall components is a pre-hydrophobated precipitated silica. The pre-hydrophobated silica is prepared, prior to mixing with the elastomer(s), by reacting hydroxyl groups (e.g. silanol groups) contained on the surface of a precipitated silica with an alkoxyorganomercaptosilane or a combination of an alkoxyorganomercaptosilane and a substituted alkylsilane or with a bis-3(trialkoxysilylalkyl) polysulfide which contains an average of from 2 to 4 connecting sulfur atoms in its polysulfidic bridge to form a composite thereof. The alcohol byproduct therefrom is removed from the composite prior to its introduction into the rubber composition(s). In another aspect of the invention, the connecting sidewall, and optionally the tread, rubber compositions are free of N-(1,3-dimethylbutyl)-N'-phenyl-p-phenylenediamine antidegradant (an antidegradant obtainable from the Flexsys Company as a Santoflex™ 6PPD and referred to herein as "6PPD") in order to prevent in situ formation of methyl isobutyl ketone byproduct from the reaction of 6PPD with atmospheric oxygen and/or ozone.

BACKGROUND OF THE INVENTION

Tires are a complex structural combination of many components of various physical properties and of various compositions. Two of such components are a circumferential tire tread which is intended to be ground-contacting and pair of tire sidewalls which conventionally extend between the tire's spaced apart bead portions radially outward to the peripheral edges of the tire tread.

Tire treads and tire sidewalls are normally intended to present very different properties for a tire. For example, tire treads, which are intended to be ground contacting, are normally expected to provide physical properties such as, for example, traction and resistance to abrasion. For example, tire sidewalls, which are not intended to be ground contacting, are normally expected to provide physical properties such as, for example, resistance to flex fatigue and scuff resistance.

For this invention, it is desired to present a tire with a tread, and optionally its sidewalls, which contains silica reinforcement in which the silica reinforcement is provided as a pre-formed silica/coupler composite, namely a pre-hydrophobated precipitated silica.

In practice, various tires with silica reinforced rubber treads have been described and manufactured. Some tires have been mentioned which have silica containing rubber sidewall(s). Some tires have been mentioned which have both treads and associated sidewalls which are composed of silica containing rubber compositions.

Alkoxysilane based coupling agents (e.g. bis(3-trialkoxysilylalkyl)polysulfides) are often used to aid in coupling of precipitated silicas to diene-based elastomers in a rubber composition. However, such alkoxysilane moieties rely upon reaction with hydroxyl groups (e.g. silanol groups) contained on the surface of the precipitated silica which in turn produces an alcohol byproduct in situ within the rubber composition itself which therefore presents an alcohol evaporative emissions concern either during the manufacture of the tire or for the resultant tire itself.

In practice, tire tread and tire sidewall rubber compositions normally contain antidegradants which may be either amine based or phenolic based antidegradants. Amine based antidegradants are usually preferred because they are usually more effective in inhibiting atmospheric degradation of diene-based elastomers than phenolic based antidegradants. A widely used and generally effective amine based antidegradant is N-(1,3-dimethylbutyl)-N'-phenyl-p-phenylenediamine, which may sometimes be referred to as "6PPD". However, the dimethylbutyl moiety of the 6PPD forms a methyl isobutyl ketone byproduct upon reacting in its intended role as antidegradant in the tire with oxygen and/or ozone which can present a methyl isobutyl ketone evaporative emissions concern for the resultant tire. In practice, a presence of an effective antidegradant in a tire sidewall rubber composition is normally considered to be necessary to retard atmospheric (e.g. ozone and oxygen) degradation of diene-based elastomers contained in the sidewall rubber composition. Normally, it is considered herein that a complete replacement of the 6PPD with either phenolic antidegradants or other amine based antidegradants is not considered as being as effective as using a significant amount of the 6PPD itself to prevent atmospheric degradation of diene-based elastomers in the sidewall rubber composition.

For this invention, it is desired to provide a tire with a combination of a tire tread and associated sidewalls of individual rubber compositions which has reduced, or substantially eliminated, alcohol and methyl isobutyl ketone evaporative emissions.

Accordingly, a tire with a tread and optionally a sidewall is provided which is comprised of individual rubber compositions which contain a pre-hydrophobated silica reinforcement with the sidewall, and optionally the tread, does not contain the 6PPD antidegradant.

For said pre-hydrophobation purposes, the precipitated silica may be pre-treated with a mercaptosilane and optionally an alkoxysilane prior to its addition to the tread and sidewall rubber compositions. One aspect of such pre-hydrophobation of the precipitated silica is to reduce, or substantially eliminate, evolution of alcohol during the actual mixing of the silica with the rubber compositions.

From a historical perspective, a tire may be prepared with a rubber component which contains a precipitated silica which is hydrophobated in situ within the elastomer host by addition of both a coupling agent, as an organomercaptosilane, and an alkyl silane. For example, see U.S. Pat. No. 4,474,908. However, for this invention, it is required that the precipitated silica is pre-hydrophobated to substantially reduce the hydroxyl group content on its surface prior to its addition to the rubber composition.

From a historical perspective, tires may also be prepared with a rubber component in which both a coupling agent, as an organosilyl polysulfide, and an alkylsilane are individually added to a silica-containing rubber composition to treat the amorphous silica in-situ within the rubber host with both a hydrophobating agent (the alkylsilane) and a silica coupler (the organosilyl polysulfide compound). For example, see U.S. Pat. No. 5,780,538.

From a historical perspective, tires may be prepared where one or more of its components (e.g. tread and sidewall) are silica reinforced wherein the silica is pre-treated with a coupling agent and, optionally, a substituted alkylsilane, prior to addition of the silica to the associated rubber composition with an expected result of reduction of alcohol evolution upon mixing the silica with the rubber composition. For example, see European patent publication EP-A-1 142 730 where the silica is pre-hydrophobated with an alkylsilane (Formula I therein) such as, for example, an alkoxyorganosilane which will release an alcohol byproduct upon reaction with alcohol groups (e.g. silanol groups) contained on the surface of a precipitated silica and an organomercaptosilane (Formula II therein) such as, for example, an alkoxyorganomercaptosilane which will also release an alcohol byproduct upon reaction with alcohol groups (e.g. silanol groups) contained on the surface of a precipitated silica.

Representative examples of such alkylsilanes, and particularly alkoxyalkylsilanes are provided in said European patent publication for the pre-hydrophobation of the silica (from its Formula I) are trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative examples of such organomercaptosilanes, and particularly alkoxyorganomercaptosilanes are provided in said European patent publication for the pre-hydrophobation of the silica (from its Formula (II) triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, it is recognized that precipitated silica aggregates are typically hydrophilic (water attracting) in nature and, in order to aid in dispersing the silica aggregates in various rubber compositions, it is sometimes desired to make the silica aggregates more hydrophobic (water repelling) in nature and therefore more compatible with the rubber. Accordingly, and as described in the aforesaid U.S. Pat. Nos. 4,474,908 and 5,780,538, a hydrophobating agent may be added to a rubber composition in addition to the precipitated silica to combine with the silica in-situ within the rubber host to make the silica more hydrophobic in nature.

However, it is considered herein, for tire tread and tire sidewall applications where properties are desired by silica reinforcement are often sought, and particularly where a good homogeneous dispersion in the rubber host is often sought, that an in-situ modification of the amorphous silica within a viscous rubber host on a hit and miss basis, under relatively harsh high sheer and high temperature conditions is a relatively inefficient procedure of modifying the amorphous silica for use in rubber compositions which are intended to be silica reinforced, particularly where both an organosilane and alkyl silane are used which would compete within the rubber composition for reaction sites on the silica surface and particularly where an alcohol byproduct is formed in situ within the rubber composition which is then available as an evaporative emission.

Accordingly in one aspect, it is proposed herein to provide a tire having a combination of both tread and sidewall components comprised of individual rubber compositions which contain particulate pre-hydrophobated precipitated silica aggregates where the silica aggregates are added to, or mixed with, the individual rubber compositions in a pre-hydrophobated form instead of more inefficiently subsequently hydrophobating the silica aggregates in situ within the elastomer host, thus essentially eliminating formation of an alcohol byproduct therefrom in situ within the rubber composition itself and thereby essentially eliminating such in situ formed alcohol as a subject of evaporative emission.

From a historical perspective, according to U.S. Pat. Nos. 5,708,069 and 5,789,514 a silica gel may be derived by hydrophobating a silica hydrogel with both an organomercaptosilane and alkyl silane and drying the product. The resulting hydrophobated silica gel may be blended with natural rubber and/or synthetic rubber. This invention is intended to be exclusive of recovered silica gels and is intended to be limited to precipitated silica aggregates.

Also, historically, according to U.S. Pat. No. 5,750,610, an organosilicate-modified silica gel may be hydrophobated with both an organomercaptosilane and alkyl silane and the dried treated organosilicate-modified silica gel blended with natural rubber and/or synthetic rubber. This invention is not intended to be directed to use of such modified silica gels which, for the purposes of this invention, are intended to be distinguished from rubber reinforcing precipitated silica.

A general description of silica gel and precipitated silica may be found, for example, in the *Encyclopedia of Chemical Technology*, Fourth Edition (1997), Volume 21, Kirk-Othmer in Pages 1020 through 1023.

The pre-hydrophobated, rubber reinforcing, precipitated silica aggregates for this invention are not intended to be said silica gels referenced in the above *Encyclopedia of Chemical Technology*.

A further descriptive discussion of silica gels and precipitated silicas may be found, for example, in U.S. Pat. No. 5,094,829 which, as such reference, is intended to be incorporated here in its entirety.

A significant aspect of this invention is the preparation of a tire with reduced evaporative emissions which requires a combination of a structural aspect of a cooperative composite of combined tread and sidewall components of individual rubber compositions which contain pre-hydrophobated precipitated silica aggregates instead of precipitated silica aggregates which are hydrophobated in situ within the elastomer host taken in combination with requiring the sidewall rubber, and optionally also the tread rubber, to be exclusive of the 6PPD antidegradant and taken in combination with requiring the sidewall rubber itself to contain a significant content of low unsaturation EPDM rubber or brominated copolymer of isobutylene and p-methylstyrene to produce a tire with reduced evaporative emissions. It is considered that such combination of cooperative tire tread and sidewall components is a significant departure from past practice, particularly where evaporative emissions is taken into consideration for a tire with acceptable performance characteristics.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, a tire is provided which contains a tread and sidewall composite of a circumferential rubber tread and rubber sidewalls connecting to said peripheral edges of said tread, wherein said tread and sidewall are comprised of, based upon parts by weight per 100 parts by weight rubber (phr):

(A) a circumferential tread of a rubber composition, optionally containing N-(1,3-dimethylbutyl)-N'-phenyl-p-phenylenediamine and comprised of
  (1) at least one hydrocarbon conjugated diene-based elastomer, and
  (2) about 10 to about 120, alternately about 40 to about 100, phr of reinforcing filler for said tread wherein said reinforcing filler is comprised of:
    (a) about 40 to about 100, alternately about 50 to about 80, phr of particulate, pre-hydrophobated precipitated silica aggregates, and
    (b) zero to about 60, alternately about 3 to about 30, phr of rubber reinforcing carbon black, and (B) at least one rubber sidewall connected to and integral with said tread wherein said sidewall is of a rubber composition exclusive of N-(1,3-dimethylbutyl)-N'-phenyl-p-phenylenediamine and comprised of:
  (1) from 10 to about 60, alternately about 30 to about 50, phr of at least one substantially low unsaturation rubber selected from at least one of EPDM rubber, and brominated copolymer of isobutylene and p-methyl styrene, and
  (2) about 40 to about 90, alternately about 50 to about 70, phr of at least one diene-based unsaturated elastomer selected from at least one of cis 1,4-polyisoprene rubber and cis 1,4-polybutadiene rubber, and
  (3) about 20 to about 100, alternately about 30 to about 60, phr of reinforcing filler comprised of:
    (a) zero to about 100, alternately about 30 to about 60, phr of rubber reinforcing carbon black, and
    (b) zero to about 100, alternately about 30 to about 60, phr of pre-hydrophobated precipitated silica
  wherein said pre-hydrophobated precipitated silica aggregates for said tread and sidewall rubber compositions are prepared by treating:
    (i) precipitated silica, or
    (ii) silica in an aqueous colloidal form thereof,
  with
    (i) an organomercaptosilane, or
    (ii) an organomercaptosilane and a substituted alkylsilane in a weight ratio of said organomercaptosilane to said substituted alkylsilane in a range of from 10/90 to 90/10, or
    (iii) a bis-3(triethoxysilylpropyl) polysulfide having an average of from 2 to about 4, preferably an average or from 2 to about 2.6 to the exclusion of an average greater than 2.6, connecting sulfur atoms in its polysulfidic bridge;
  wherein said substituted alkylsilane is of the general Formula (I):

$$X_n\text{—Si—}R_{4-n} \tag{I}$$

wherein R is an alkyl radical having from one to 18, preferably from one to 8, carbon atoms such as, for example, methyl, ethyl, isopropyl, n-butyl and octadecyl radicals, n is a value of from 1 to 3 and X is:
    (i) a halogen radical selected from chlorine and bromine radicals, preferably a chlorine radical, or
    (ii) an alkoxy radical, as $(R^1O)$—, wherein $R^1$ is an alkyl radical having from one to 3 carbon atoms selected from, for example, methyl, ethyl and isopropyl radicals, preferably from methyl and ethyl radicals, and more preferably an ethyl radical, and
  wherein said organomercaptosilane is of the general formula (II):

$$(Y)_n(R^2O)_{3-n}\text{—Si—}R^3\text{—SH} \tag{II}$$

wherein Y is a radical selected from halogen, namely chlorine or bromine, preferably a chlorine radical, and alkyl radicals having from one to 16, preferably from one to 4, carbon atoms, preferably selected from methyl, ethyl, n-propyl and n-butyl radicals; wherein $R^2$ is an alkyl radical having from one to 16, preferably from one to 4 carbon atoms, preferably selected from methyl and ethyl radicals and $R^3$ is an alkylene radical having from one to 16, preferably from one to 4, carbon atoms, preferably a propylene radical; n is a value from zero to 3, preferably zero.

The pre-hydrophobated precipitated silica aggregates might be recovered, for example, from said treated precipitated silica or said treated colloidal silica. For example where it is a treated silica hydrosol, such recovery might be by the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid *Condensed Chemical Dictionary* and U.S. Pat. No. 5,094,829 as well as in U.S. Pat. Nos. 5,708,069, 5,789,514 and 5,750,610 for a more detailed discussion.

In the practice of this invention, a tire with a combination tread and connecting sidewall components is provided with reduced, or substantially eliminated, alcohol and methyl isobutyl ketone evaporative emissions.

Thus, in one aspect of the invention, said tread and sidewall rubber compositions do not contain an in situ formed alcohol evaporative emission byproduct and said sidewall rubber composition does not contain a methyl isobutyl ketone evaporative emission byproduct.

In particular, in the practice of this invention, a tire is provided having a tread rubber composition, and optionally a sidewall rubber composition which contains silica reinforcement in which the silica is pre-reacted (pre-hydrophobated) with a coupling agent prior to its introduction to, or mixing with, the rubber composition in order to prevent, or substantially eliminate, in situ formation of alcohol within the rubber composition, and resulting tire, itself.

In one aspect of the invention, the said pre-hydrophobated silica is a pre-hydrophobated precipitated silica for which an alcohol byproduct is produced by such pre-hydrophobation thereof, from which said produced alcohol byproduct is removed therefrom prior to addition of said pre-hydrophobated precipitated silica to the tread and sidewall rubber compositions and tread and sidewall rubber compositions exclusive of added materials which are reactive with hydroxyl groups contained on the surface of said precipitated silica to significantly produce an alcohol byproduct therefrom in situ within the rubber composition. In practice, it is desired that such excluded added materials are bis(3- trialkoxysilylalkyl) polysulfides, alkoxyalkylsilanes, and alkoxyorganomercaptosilanes.

In practice, it is also preferred that the rubber composition of said tread and sidewall which contains the pre-hydrophobated silica does not contain additional silica which contains hydroxyl groups on its surface.

The sidewall rubber composition is exclusive of (does not contain) the 6PPD antidegradant although the tread rubber composition may contain the 6PPD antidegradant. Therefore, in one aspect of the invention, the tread rubber composition contains the 6PPD antidegradant and in another aspect of the invention, the tread rubber composition is required to be exclusive of the 6PPD antidegradant.

A significant aspect of this invention is the significant reduction in evaporative emissions in the manufacture and use of the tire, namely elimination of in situ formed alcohol and methyl isobutyl ketone byproducts from the external sidewall component of the tire and in situ formed alcohol from the external tread rubber component of the tire as well as elimination of the methyl isobutyl ketone byproduct from the tread when it is required that the tread rubber composition is exclusive of the 6PPD antidegradant.

This is considered herein to be significant because alcohol and methyl isobutyl ketone are the major volatile emissions from tires which have silica (together with coupling agents which form alcohol byproducts) reinforced tread and conventional connecting sidewall rubber compositions which contain the 6PPD antidegradant.

Another significant aspect of this invention is that tire performance is maintained at optimum level through the use of pre-hydrophobated silica in the tread and optionally sidewall, and sidewall compositions which contain saturated rubbers. This is considered herein to be significant because without use of such pre-hydrophobated silica and saturated rubbers, neither a silica reinforced tread nor a black sidewall could be provided which combines elimination of in situ formed alcohol from the tread and in situ formed alcohol and methyl isobutyl ketone evaporative emissions from the sidewall with excellent tire performance.

Representative substituted alkylsilanes, particularly alkoxyalkylsilanes, of Formula (I) for the pre-hydrophobation of the silica, particularly pre-hydrophobation of a precipitated silica, are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative alkoxyorganomercaptosilanes of Formula (II) for the pre-hydrophobation of the silica are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

It is to be appreciated that a reaction of said alkoxyalkylsilanes and said alkoxyorganomercaptosilanes with alcohol groups (e.g. silanol groups) contained on the surface of a synthetic precipitated silica will be expected to form an alcohol byproduct. Such alcohol byproduct, when formed, is removed from the pre-hydrophobated precipitated silica product prior to its addition to the rubber composition for said tire tread and said tire sidewall.

In the practice of this invention, the tread of the tire may be a rubber composition comprised of various conjugated diene based elastomers. Such diene-based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

For example, representative of such elastomers are cis 1,4-polyisoprene rubber (natural and synthetic), cis 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

In one aspect of the invention, the diene-based elastomer may be comprised of an organic solvent solution polymerization derived copolymer of styrene and 1,3-butadiene having at least a 70 percent trans 1,4-microstructure based upon the polybutadiene component of the copolymer.

In practice, the elastomer(s) may also be comprised of at least one functionalized diene-based elastomer as polymers of at least one of isoprene and 1,3-butadadiene and copolymers of styrene and at least one of isoprene or alpha methylstyrene and 1,3-butadiene such as, for example, (A) functionalized diene-based elastomer which contains one or more functional groups available for reaction with or interaction with said pre-hydrophobated silica and/or carbon black reinforcing filler, wherein said functional groups are selected from at least one of terminal and/or pendant hydroxyl and carboxyl groups, and (B) functionalized diene-based elastomer which contains at least one terminal and/or pendant functional group available for reaction with or interaction with said prehydrophobated silica and/or carbon black reinforcing filler selected from isocyanate groups, blocked isocyanate groups, epoxide groups, amine groups such as for example primary amine groups, secondary amine groups and heterocyclic amine groups, hydroxypropyl methacrylate (HPMA) groups, acrylate groups and anhydride groups, where it is understood that such functionalization will not result in the production of an alcohol by product which can contribute to evaporative emissions from the tire.

Such functionalized type of elastomers are understood to be known to those having skill in such art.

The diene-based elastomer which contains reactive hydroxyl groups and/or carboxyl groups, may be prepared, for example, by organic solvent polymerization of isoprene and/or 1,3-butadiene or copolymerization of styrene or alpha methylstyrene with isoprene and/or 1,3-butadiene.

The introduction of reactive hydroxyl and/or carboxyl groups on said diene-based elastomer may be accomplished by, for example, radical grafting one or more functional groups of interest onto the polymer backbone, copolymerization of polymerizable materials which contain one or more functional groups of interest, deprotection of protected copolymerized groups, addition to a fraction of the unsaturated backbone, and for end terminated polymers a reaction of the living polymer chain with a molecule containing the function of interest. An amine group may be introduced in a styrene/butadiene copolymer, for example, by first modifying the styrene monomer with a pyrrolidone and then copolymerizing the modified styrene with 1,3-butadiene monomer.

Exemplary of such diene-based elastomers which contain hydroxyl and/or polar functional groups and multifunctional compatibilizers are, for example hydroxyl terminated polybutadienes, hydroxyl terminated polyisoprenes, anhydride-containing polybutadiene and/or polyisoprene elastomers, using, for example anhydrides from the Sartomer Company as the Ricobond™ series of anhydrides, urethane-containing polybutadiene and/or polyisoprene, using, for example, urethane from the Sartomer Company as CN302™, diacrylate-containing polybutadiene and/or polyisoprene using, for example diacrylate from the Sartomer Company as CN303™, epoxide-containing elastomer such as, for example, an epoxidized natural rubber (epoxidized cis 1,4-polyisoprene).

Organic solvent polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example, in U.S. Pat. No. 5,064,901.

For the sidewall component(s) elastomers diene-based elastomers as a combination of cis 1,4-polyisoprene rubber and cis 1,4-polybutadiene rubber are normally used.

However, for the sidewall rubber composition of this invention, primarily because it is required that an antidegradant exclusive of the 6PPD is used, a significant portion (usually at least 30 phr) of the sidewall rubber is required to be low unsaturation rubbers which are less sensitive to atmospheric degradation than the aforesaid diene-based elastomers. For the purposes of this invention, such low unsaturation elastomers are at least one of EPDM and brominated copolymers of isobutylene and p-methylstyrene.

Representative of EPDM's (ethylene/propylene/nonconjugated diene) terpolymer elastomers are, for example, ethylene, propylene and minor amounts (e.g. from 2 to 6 weight percent of the terpolymer) of nonconjugated diene hydrocarbons such as, for example, ethylidene norbornadiene, 1,4-hexadiene and dicyclopentadiene.

The brominated copolymers of isobutylene and p-methylstyrene typically have repeat units derived from polymerization of isobutylene and paramethylstyrene monomers. The bromine content may be from about 0.1 to about 4 percent by weight and more desirably from about 0.1 to about 2.5 percent by weight, based upon the weight of the brominated polymer. The isobutylene content is desirably from about 85 to about 99.4, or up to about 99.8, alternately about 88 to about 97.9, weight percent.

The paramethylstyrene content is usually from about 1 to about 14, alternately about 2 to about 11, weight percent. Repeat units of other monomers may also be present or may be excluded. A number of such polymers are commercially available from Exxon Chemical Company as Exxpro™ and a preparation of such polymers is exemplified, for example, in U.S. Pat. No. 5,162,445 which is hereby incorporated by reference in its entirety.

It is intended that the tire tread rubber composition intended to be ground contacting is exclusive of such EPDM and brominated copolymers of isobutylene and p-methylstyrene polymers.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black and pre-hydrophobated silica as already hereinbefore discussed. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated, which is more primarily directed to a tire with tread and connecting sidewall components of individual rubber compositions which contain the described particulate, pre-hydrophobated precipitated silica aggregates with the sidewall and optionally the tread being exclusive of the 6PPD antidegradant.

The tires can be built, shaped, molded and cured by various methods which will be readily apparent to those having skill in such art.

The following examples are provided to further illustrate the invention in which the amounts and percentages of materials are by weight unless otherwise indicated.

EXAMPLE I

Samples of rubber compositions were prepared, as illustrated in Table 1, by blending the ingredients in an internal rubber mixer using two separate, sequential, mixing stages, or steps, namely a first relatively high maximum temperature non-productive mixing stage followed by a second, significantly lower maximum temperature productive mixing stage.

Sample A represents a Control as an exemplary tire sidewall rubber composition which contains conventional amine based antidegradants, particularly including the 6PPD antidegradant which generates an undesirable methyl isobutyl ketone (MIBK) chemical reaction byproduct upon exposure to atmospheric conditions of oxygen and ozone.

Samples B and C represent exemplary tire sidewall rubber compositions which do not contain amine based antidegradants and therefore do not contain the 6PPD antidegradant so that an MIBK byproduct will not be generated upon exposure of the rubber composition to atmospheric conditions.

Sample B contains an EPDM low unsaturation rubber and a pre-hydrophobated precipitated silica which does not yield an in-situ formed alcohol by-product within the rubber composition in the absence of a coupling agent or substituted alkylsilane additive which would form the alcohol by-product upon its exposure to the precipitated silica within the rubber composition.

Sample C contains a blend of diene-based elastomers and a low unsaturation brominated copolymer of isobutylene and p-methylstyrene.

It is to be appreciated that the significant presence of the low unsaturation EPDM rubber in Sample B and the low unsaturation brominated copolymer in Sample C reduces, or essentially eliminates, the need for the presence of the amine based 6PPD antidegradant since the presence of the low unsaturation polymers provide comparable ozone and weathering protection for the respective rubber compositions.

For the preparation of the Samples, in the first, or non-productive mixing stage, the ingredients are mixed for about 4 minutes to an autogeneously generated, via the high shear mixing in the internal rubber mixer, drop temperature of about 150° C. at which time the batch is "dropped", or removed, from the associated internal rubber mixer. The batch is sheeted out and allowed to cool to a temperature below 40° C., namely below 30° C. The batch is then mixed in a productive mixing stage during which free sulfur and vulcanization accelerator(s) are added for a period of about 2 minutes to a drop temperature of about 110° C.

The cure behavior and various cured physical properties of the respective Samples are shown in the subsequent Table 2. The Samples were individually cured for about 12 minutes at a temperature of about 170° C.

TABLE 1

| | Control Sample A | Sample B | Sample C |
|---|---|---|---|
| Non-Productive Mixing Stage | | | |
| EPDM[1] | 0 | 40 | 0 |
| Natural cis 1,4-polyisoprene rubber | 40 | 30 | 10 |
| Cis 1,4-polybutadiene[2] | 60 | 30 | 40 |
| Pre-hydrophobated silica[3] | 0 | 28 | 0 |
| Fatty Acid[4] | 1 | 2 | 0 |
| Antidegradants (antizonant/antioxidant)[5] | 5.3 | 0 | 0 |
| Rubber processing oil[6] | 13 | 28 | 11 |
| Wax[7] | 1 | 0 | 0 |
| Zinc oxide | 0 | 1.5 | 0 |
| Brominated copolymer[8] | 0 | 0 | 50 |
| Carbon black | 50 | 0 | 50 |
| Productive Mixing Stage | | | |
| Sulfur | 2 | 1.7 | 0.1 |
| Accelerator(s)[9] | 0.5 | 1.6 | 1.65 |

TABLE 1-continued

| | Control Sample A | Sample B | Sample C |
|---|---|---|---|
| Zinc oxide | 0 | 0 | 0.8 |
| Fatty acid[4] | 0 | 0 | 0.8 |

[1]Obtained as Royalene 505 ™ from the Uniroyal Company as a terpolymer of ethylene, propylene and a minor amount of ethylidene norbornadiene
[2]Cis 1,4-polybutadiene rubber obtained as Budene1207 ™ from The Goodyear Tire & Rubber Company
[3]Pre-hydrophobated precipitated silica by reacting precipitated silica having hydroxyl groups (e.g. silanol groups) on its surface with a combination of alkoxyorganomercaptosilane and alkoxy substituted alkylsilane with an inherent evolution of an alcohol which is removed from the product prior to addition to the elastomer in this Example. For example, see the aforesaid European patent publication EP-A-1 142 730 for pre-hydrophobation of precipitated silica with an alkoxyalkylsilane (from exemplified alkoxyalkysilanes of Formula I therein) and alkoxyorganomercaptosilane (from exemplified alkoxyorganomercaptosilanes of Formula II therein).
[4]Primarily stearic acid
[5]Amine and quinoline based antidegradants as Santoflex ™ 6PPD from the Flexsys Company, Flectol TMQ ™ from Flexsys and Wingstay ® 100 from The Goodyear Tire & Rubber Company
[6]Flexon 641 ™ from the ExxonMobil Company
[7]Blend of microcrystalline and paraffinic waxes
[8]Brominated copolymer of isobutylene and p-methylstyrene as MDX 93-4 ™ from the ExxonMobil Company
[9]Sulfenamide and guanidine based sulfur cure accelerators

TABLE 2

| Test Properties | Control Sample A | Sample B | Sample C |
|---|---|---|---|
| Rheometer, 170° C. | | | |
| Maximum torque (dNm) | 8.4 | 7.6 | 7.7 |
| Minimum torque (dNm) | 1.7 | 0.8 | 1.7 |
| T90 (minutes) | 3.8 | 3.2 | 11.7 |
| Stress-strain (cured 11' at 170° C.) | | | |
| Tensile strength (MPa) | 11.9 | 7.6 | 13.1 |
| Elongation at break (%) | 640 | 660 | 760 |
| 300% modulus (MPa) | 3.8 | 2.5 | 4 |
| RPA (150° C. cure cycle, 11 Hz, 100° C.) | | | |
| G' at 10% strain, (MPa) | 0.68 | 0.67 | 0.65 |
| Tan delta at 10% strain | 0.11 | 0.1 | 0.19 |

EXAMPLE II

Illustrative Tire Tread Compositions

Samples of silica rich rubber compositions for a tire tread are prepared according to Table 3. The elastomers are emulsion polymerization prepared styrene/butadiene copolymer rubber (E-SBR) and high cis 1,4-polybutadiene rubber.

The rubber compositions are prepared by blending the ingredients in an internal rubber mixer using two separate stages of addition of the ingredients, namely, a relatively high temperature first non-productive mixing stage and a second, relatively lower temperature, productive mixing stage where sulfur and accelerator(s) are added.

The Samples are represented in this Example as Control Sample D and Sample E. For Sample E, a pre-hydrophobated silica is substituted for the precipitated silica of Control Sample D.

Control Sample D and Sample E contained the 6PPD antidegradant.

For the preparation of the Samples, in the first, or non-productive internal mixing stage, the ingredients are mixed for about 4 minutes to an autogeneously reached drop temperature of about 150° C. In the second or productive mixing stage, sulfur and accelerator(s) are added and mixed for about 2 minutes to an autogeneously reached drop temperature of about 110° C.

Cure behavior and various cured physical properties for each composition are shown in Table 4. The samples are individually cured for 12 minutes at about 170° C.

TABLE 3

Illustrative Tire Tread Rubber Compositions

|  | Control Sample D | Sample E |
|---|---|---|
| Non-Productive Mixing (150° C.) | | |
| E-SBR[1] (60 phr rubber, 12.5 phr oil) | 82.5 | 82.5 |
| Cis 1,4-polybutadiene rubber[2] | 40 | 40 |
| Precipitated silica[3] | 76 | 0 |
| Processing oil, wax, resins | 13.5 | 13.50 |
| Coupling agent[4] | 12 | 0 |
| Antidegradant (6PPD) | 2 | 2 |
| Fatty Acid[5] | 3 | 3 |
| Zinc oxide | 1.3 | 1.3 |
| Pre-hydrophobated silica[6] | 0 | 77 |
| Carbon black | 0 | 6 |
| Productive Mixing (110° C.) | | |
| Antidegradant[7] (not 6PPD) | 1 | 1 |
| Accelerator(s)[8] | 3.7 | 3.5 |
| Zinc oxide | 1.3 | 1.3 |
| Sulfur | 2.2 | 2.2 |

[1]Obtained as 50/50 blend of 23.5 percent bound styrene E-SBR and 40 percent bound styrene E-SBR containing 37.5 phr of highly aromatic oil in each E-SBR from The Goodyear Tire & Rubber Company
[2]Obtained as Budene 1208 ™ from The Goodyear Tire & Rubber Company
[3]Silica as Zeopol 8745 ™ from the Huber Company which has hydroxyl groups (e.g. silanol groups) on its surface
[4]A 50/50 composite, by weight, of carbon black and a bis(3-triethoxysilylpropyl) polysulfide having an average connecting sulfur atoms in its polysulfidic bridge in a range of from 2 to 2.5 obtained as X266S ™ from the Degussa Company
[5]Primarily stearic acid
[6]Pre-hydrophobated silica of Example I
[7]Amine based antidegradant as Wingstay 100 ™ from The Goodyear Tire & Rubber Company
[8]Sulfenamide and guanidine based sulfur cure accelerators

TABLE 4

Tire Tread Compound Test Properties

|  | Control Sample D | Sample E |
|---|---|---|
| Rheometer, 160° C. | | |
| Maximum torque (dNm) | 18.4 | 20.2 |
| Minimum torque (dNm) | 2 | 2.1 |
| T90 (minutes) | 7.3 | 6 |
| Stress-strain (cured 14' at 160° C.) | | |
| Tensile strength (MPa) | 15.8 | 16.4 |
| Elongation at break (%) | 540 | 500 |
| 300% modulus (MPa) | 77 | 8.3 |
| RPA (150° C. cure cycle, 11 Hz, 100° C.) | | |
| G' at 10% strain (MPa) | 2.74 | 2.76 |
| Tan delta at 10% strain | 0.126 | 0.113 |
| DIN abrasion, relative volume loss | 132 | 133 |

From Tables 2 and 4, it can be seen that tire compounds for sidewall and tread components can be produced with different material compositions which have properties considered adequate for that tire component in a tire.

EXAMPLE III

Tires of size P225/50R17 were prepared having a treads of rubber compositions and connecting sidewalls of rubber compositions illustrated in Examples I and II as shown in the following Table 5 wherein Tire A is considered as being a Control Tire.

TABLE 5

| Tire | Tread | Sidewall |
|---|---|---|
| A | Sample D of Example II | Sample A of Example I |
| B | Sample E of Example II | Sample C of Example I |
| C | Sample E of Example II | Sample B of Example I |

Thus for Tire A, the tread rubber composition (Sample D) is reinforced with a precipitated silica which contains hydroxyl groups on its surface together with an bis (3-triethoxysilylpropyl) polysulfide coupling agent, of which the reaction thereof inherently produces ethanol by-product in situ within the rubber composition. The tread rubber composition also contains the 6PPD antidegradant which produces an MIBK by-product upon exposure to atmospheric conditions.

For Tire A, the sidewall rubber composition (Sample A) is carbon black reinforced without silica reinforcement and contains the 6PPD antidegradant which forms the MIBK by-product upon exposure to atmospheric conditions.

For Tire B, the tread composition (Sample E) contains the pre-hydrophobated silica reinforcement, without additional coupling agent being added to the rubber composition and so does not form the alcohol by-product in situ within the rubber composition. The tread rubber composition does contain the 6PPD antidegradant.

For Tire B, the sidewall rubber composition (Sample C) contains a significant content of the low unsaturation brominated copolymer of isobutylene and p-methylstyrene polymer. The sidewall rubber composition is reinforced with carbon black without silica reinforcement and accompanying coupling agent and so does not form the alcohol by-product in situ within the rubber composition. The sidewall rubber composition does not contain the 6PPD antidegradant and so does not form the MIBK by-product upon exposure to atmospheric conditions.

For Tire C, the tread rubber composition (Sample E) contains the pre-hydrophobated silica reinforcement, without additional coupling agent being added to the rubber composition and so does not form the alcohol by-product in situ within the rubber composition. The tread rubber composition does contain the 6PPD antidegradant.

For Tire C, the sidewall rubber composition (Sample B) contains a significant content of the low unsaturation EPDM rubber. The sidewall rubber composition contains the pre-hydrophobated silica reinforcement, without additional coupling agent being added to the rubber composition and so does not form the alcohol by-product in situ within the rubber composition. The sidewall rubber composition does not contain the 6PPD antidegradant and so does not form the MIBK by-product upon exposure to atmospheric conditions.

The tires were submitted to an evaporative emissions test. For the test, four of each of the tires were mounted on wheels and placed in an enclosed container. The temperature had been adjusted to 18° C. For the test the temperature was increased from 18° C. to 41° C. over a periods of 12 hours after which the temperature was reduced from 41° C. to 18° C. over a period of 12 hours. After the 24 hour period of the test, a total evaporative emissions was taken. Table 6 reports such total evaporative emissions with the reading for the Control Tire A being assigned herein a value of 100 and total evaporative emissions from Tires B and C being values normalized to the value of 100 for the Control Tire A.

TABLE 6

| | Control Tire A | Tire B | Tire C |
|---|---|---|---|
| Total evaporative emissions | 100 | 88.1 | 68.3 |
| Evaporative emission reduction (percent) | — | 11.9 | 31.7 |

From Table 6 it can be seen that a significant evaporative emission reduction was observed for Tire B which had a combined tread rubber and sidewall rubber composition in which the tread rubber composition was formulated to contain silica reinforcement without an in situ formation of an alcohol by-product, with the sidewall rubber composition being devoid of a 6PPD antidegradant (thus eliminating the MIBK byproduct formation from the sidewalls), and where the sidewall rubber composition is adapted to contain a significant content of low unsaturation brominated copolymer of isobutylene and p-methylstyrene.

From Table 6 it can be seen that a very large evaporative emission reduction was observed for Tire C which had a combined tread rubber and sidewall rubber composition in which the tread rubber composition was formulated to contain silica reinforcement without an in situ formation of an alcohol by-product, and the sidewall rubber composition being devoid of a 6PPD antidegradant with the sidewall rubber adapted to contain a significant content of low unsaturation EPDM rubber.

This is considered herein to be significant in that it is observed that a composite of a tire tread and associated connecting sidewall can be prepared of which the tread and/or sidewall may contain a significant precipitated silica reinforcement without an in situ formation of alcohol by-product in combination with an associated sidewall and, by manipulation of the sidewall rubber composition to contain a significant low unsaturation rubber content of the EPDM or brominated copolymer of isobutylene and p-methylstyrene, an elimination of a 6PPD antidegradant is possible for the sidewall with a resultant elimination of formation of an MIBK by-product insofar as the sidewall is concerned.

It is considered herein that such combination of tire tread and sidewall rubber compositions to effect a significant reduction of the respective evaporative emissions while producing a tire with tread and sidewall components of suitable physical properties and associated performance characteristics is novel and a significant departure from past practice.

While certain representative embodiments and details have been shown for the purpose of illustrating the invention, it will be apparent to those skilled in this art that various changes and modifications may be made therein without departing from the spirit or scope of the invention.

What is claimed is:

1. A tire which contains a tread and sidewall composite of a circumferential rubber tread and rubber sidewalls connecting to peripheral edges of said tread, wherein said tread and sidewall are comprised of rubber compositions containing a combination of carbon black and precipitated silica reinforcement:
   wherein said precipitated silica is pre-hydrophobated prior to its addition to said rubber composition by treatment with a bis(3-triethoxysilylpropyl) polysulfide which contains an average of from 2 to 4 connecting sulfur atoms in its polysulfidic bridge, for which ethanol byproduct is produced by such pre-hydrophobation thereof;
   wherein said ethanol byproduct is removed therefrom prior to addition of said pre-hydrophobated precipitated silica to the tread and sidewall rubber composition;
   wherein said rubber compositions of said tread and sidewalls are thereby exclusive of said ethanol produced by said pre-treatment of said precipitated silica; and
   wherein said rubber compositions of said tread and sidewalls are exclusive of N-(1,3-dimethylbutyl)-N'-phenyl-p-phenylenediamine and thereby exclusive of methyl isobutyl ketone derived from said N-(1,3-dimethylbutyl)-N'-phenyl-p-phenylenediamine.

2. The tire of claim 1 wherein:
   (A) said tread rubber composition is comprised of at least one conjugated diene-based elastomer, and
   (B) said sidewall rubber compositions are comprised of:
      (1) from 10 to about 60 phr of at least one low unsaturation rubber selected from at least one of EPDM rubber, and brominated copolymer of isobutylene and p-methyl styrene, and
      (2) about 40 to about 90 phr of at least one diene-based unsaturated elastomer selected from at least one of cis 1,4-polyisoprene rubber and cis 1,4-polybutadiene rubber.

3. The tire of claim 1 wherein said diene-based elastomer for said tread rubber composition is selected from at least one of polymers and copolymers of conjugated dienes selected from isoprene and 1,3-butadiene, copolymers of styrene and at least one of isoprene and 1,3-butadiene.

4. The tire of claim 1 wherein at least one of said elastomers is a functionalized elastomer comprised of:
   (A) functionalized diene-based elastomer which contains at least one functional group available for reaction with or interaction with said pre-hydrophobated silica and/or carbon black reinforcing filler, wherein said functional groups are selected from at least one of terminal and/or pendant hydroxyl and carboxyl groups, or
   (B) functionalized diene-based elastomer which contains at least one terminal and/or pendant functional group available for reaction with or interaction with said pre-hydrophobated silica and/or carbon black reinforcing filler selected from isocyanate groups, blocked isocyanate groups, epoxide groups, amine groups as primary amine groups, secondary amine groups and heterocyclic amine groups, hydroxypropyl methacrylate (HPMA) groups, acrylate groups and anhydride groups.

* * * * *